United States Patent [19]
Cousins

[11] 3,863,883
[45] Feb. 4, 1975

[54] MIRROR BRACKET

[76] Inventor: Boyd E. Cousins, 4534 Main St., Kansas City, Mo. 64111

[22] Filed: Dec. 15, 1972

[21] Appl. No.: 315,517

[52] U.S. Cl. ............................. 248/477, 248/488
[51] Int. Cl. ............................................. A47g 1/24
[58] Field of Search ........... 248/126, 295, 476, 477, 248/478, 488, 490, 495, 496, 466

[56] References Cited
UNITED STATES PATENTS

| | | | |
|---|---|---|---|
| 2,696,962 | 12/1954 | Goss | 248/477 |
| 2,904,290 | 9/1959 | Mullen | 248/477 X |
| 2,984,440 | 5/1961 | Simons | 248/477 |
| 3,188,028 | 6/1965 | Waller | 248/495 X |
| 3,370,821 | 2/1968 | Mingis | 248/488 X |

Primary Examiner—William H. Schultz
Attorney, Agent, or Firm—John A. Hamilton

[57] ABSTRACT

A bracket for mounting mirrors on dressers or other furniture pieces consisting of a standard affixable to a dresser to extend thereabove, upper and lower hooks mounted on the standard and normally opening respectively downwardly and upwardly to engage and support the upper and lower edges of a mirror, or the back plate of a mirror frame, the upper hook being reversible to open upwardly to form a hanger for suspending mirrors or mirror frames, and a screw clamp for further securing a mirror frame in the hooks.

6 Claims, 8 Drawing Figures

PATENTED FEB 4 1975 3,863,883
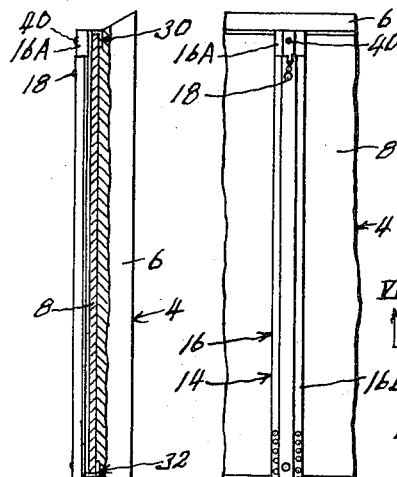
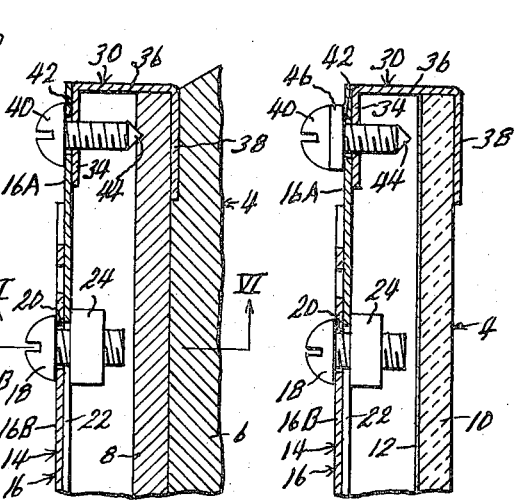
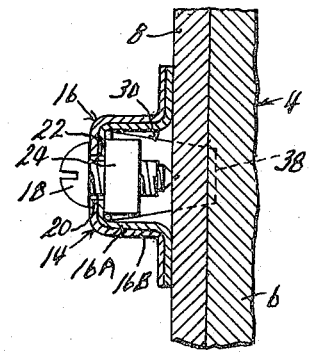
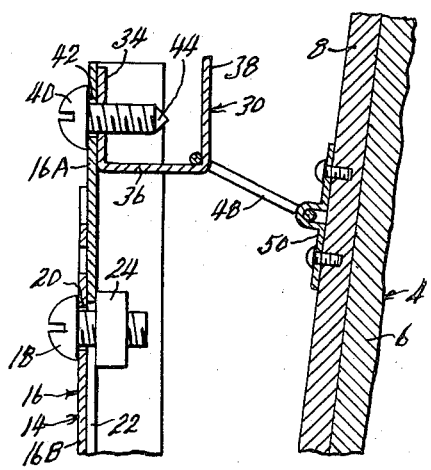
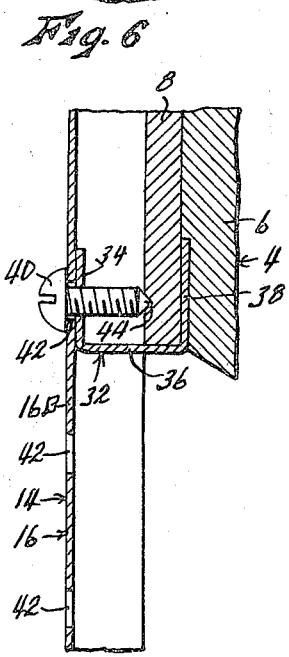
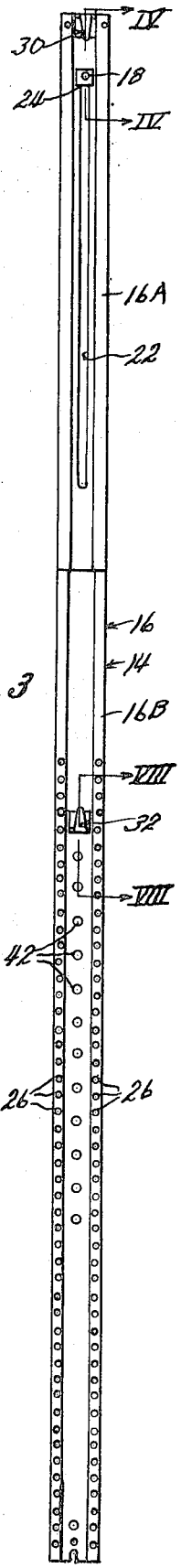

MIRROR BRACKET

This invention relates to new and useful improvements in furniture accessories, and has particular reference to a bracket for supporting a mirror in relation to a dresser or other furniture piece.

The principal object of the present invention is the provision of a mirror bracket which is extremely versatile with relation to the types of mirrors it is adapted to support, and to the type of support desired. In this connection, it may be used to support mirrors of either the framed or unframed types, of a wide variety of sizes, and the mirrors may be either firmly and rigidly clamped in position, or simply suspended from hooks for easy removal. Also, the mirror may be supported either vertically as is usually desired, or tilted slightly forwardly at its upper edge, as is sometimes preferred.

Generally, these objects are fulfilled by the provision of a bracket, any desired number of which may be used in connection with a single mirror, constituting a standard of adjustable height adapted to be affixed at its lower end to the furniture piece, upper and lower hooks secured to the standard at a variable vertical spacing, the lower hook opening upwardly and being adapted when desired to engage the lower edge of a mirror or mirror frame, and the upper hook being reversible to open either upwardly or downwardly, being adapted when opening downwardly to engage the top edge of a mirror or mirror frame, and when opening upwardly to engage and support the mounting eyes or hangers with which mirror backs are commonly furnished.

Another object is the provision of a mirror bracket of the character described having screw clamp means for further securing the mirror when said mirror is framed and the hooks can engage a non-glass portion of the frame, and means for rendering the screw clamps inoperative when the hooks must engage an unframed mirror which would break or be damaged by said screw clamps.

Other objects are extreme simplicity and economy of construction, and efficiency and dependability of operation.

With these objects in view, as well as other objects which will appear in the course of the specification, reference will be had to the accompanying drawing, wherein:

FIG. 1 is a side elevational view, partially broken away, of a dresser showing a mirror mounted thereon by means of a bracket embodying the present invention, FIG. 2 is rear elevational rearelevational view of the elements as shown in FIG. 1, FIG. 3 is a front elevational view of the bracket only, FIG. 4 is an enlarged, fragmentary sectional view taken on line IV—IV of FIG. 3, with the bracket in operative relationship to a mirror of the type shown in FIGS. 1 and 2, FIG. 5 is a view similar to FIG. 4, showing the bracket in operative relationship to an unframed mirror, FIG. 6 is a fragmentary sectional view taken on line VI—VI of FIG. 4, FIG. 7 is a view similar to FIG. 4, but with the top hook reversed to suspend a mirror, and FIG. 8 is an enlarged fragmentary sectional view taken on line VIII—VIII of FIG. 3.

Like reference numerals apply to similar parts throughout the several views, and in FIGS. 1 and 2, the numeral 2 applies to a dresser or other furniture piece above which a mirror indicated generally by the numeral 4 is to be supported. In FIGS. 1, 2, 4, 6, 7, and 8, said mirror includes a frame 6 having a back plate 8 affixed thereto and securing the mirror itself, not shown, in the frame. In FIG. 5 the mirror 4 is unframed, constituting merely a glass plate 10 having a silvered backing 12 adhered thereto.

The bracket forming the subject matter of the present invention, any number of which (usually two) may be used to support the mirror, is indicated generally by the numeral 14, and includes a vertical standard 16 consisting of upper and lower sections 16A and 16B each consisting of a forwardly opening channel having outturned flanges, the upper section being slidably nested within the lower section, and secured therein by a bolt 18. Said bolt is of less length than the depth of the channel, extends through a hole 20 formed therefor in the lower standard section and a longitudinally elongaged slot 22 formed therefor in the base of the top section, and has a nut 24 threaded thereon within the channel. By loosening the nut the standard channel sections may be moved relatively to adjust the length of the standard. A series of holes 26 are formed in the flanges of lower channel section 16B, adjacent the lower end thereof, for receiving screws 28 selectively therein for affixing the standard to dresser 2 to extend thereabove.

The bracket also includes an upper hook 30 carried by upper channel section 16A, and a lower hook 32 carried by lower channel section 16B. Said hooks are identical, each being formed of sheet metal and being of substantially U-form, each having an inner leg 34 lying flat in the base of its associated channel section, a connecting portion 36 extending forwardly and outwardly from said channel, and an outer leg 38 parallel to the standard. Each hook is secured by a screw 40 which extends inwardly and rotatably through a hole 42 provided therefor in its associated channel section, and is threaded through leg 34 of the hook. The inner end of each screw 40 is pointed, as shown at 44, and the length of the screw is such as to extend forwardly slightly beyond the plane of the flanges of the channels. Sheet metal screws are satisfactory for this purpose. Lower channel section 16B is provided with a series of longitudinally spaced holes 42 for selectively receiving screw 40 of lower hook 32.

In one usage of the bracket, the lower channel section 16B is first affixed to the back of dresser 2 by screws 28, carefully selecting the position of attachment so that the standard, at least with top channel section 16A extended upwardly, will extend to the top edge of the mirror in its desired position. Then lower hook 32 is attached to channel section 16B by its screw 40, selecting the screw hole 42 at the desired elevation of the lower edge of the mirror. Screw 40 is left somewhat loose at this time, so that its point 44 does not project forwardly of the channel. The lower edge of the back plate 8 of the mirror frame 6, or the lower edge of the glass mirror plate 10 itself if the mirror is not framed, is then inserted downwardly into hook 32. This requires that hook leg 38 be inserted between the frame and its back plate 8, as shown in FIG. 8, and while the back plate is secured to the frame, no difficulty has normally been experienced in making this insertion. If necessary, a small section of the back plate edge can be pried away from the frame. Then bolt 18 is loosened and top channel section 16A moved slidably in the lower section to bring top hook 30 to the top edge of the mirror, said top hook being arranged to open downwardly in this usage. Leg 38 is then inserted downwardly between the mirror frame and its back plate, as shown in FIG. 4, or engaged over the top edge of the mirror glass itself if it is not framed, as shown in FIG. 5, screw 40 of the top hook also being retracted at this time so as not to project forwardly of the channel. Bolt 18 is then tightened.

If the mirror is framed, as in FIGS. 4 and 8, screws 40 of both hooks are then fully tightened. This draws hook legs 34 firmly against the bases of the channels, and forces the points of the hooks into indenting relation to the rear surface of the back plate 8 of the frame. Said back plates are commonly formed of wood, fiber board or the like, and are easily indented. Then the hooks are rigidly positioned on the standard, and the back plate 8 is clamped firmly between screw points 44 and hook legs 38, and the mirror is firmly mounted. The back plate 8 may also be clamped against the standard itself, provided that the hook opening, i.e., its forward extension from the standard, is no greater than the thickness of the back plate. However, clamping of the back plate between the hook legs 38 and the screws, rather than between the hook legs and the standard, permits adaptation of the bracket to back plates of various thicknesses.

If the mirror is not framed, as shown in FIG. 5, the screw action described above cannot be permitted, since the screw points 44 would then impinge directly against the mirror plate 10, which is glass, or against its silvered backing 12, and cause damage or breakage thereof. Under these circumstances, a washer 46 (see FIG. 5) is applied to each screw 40 between the screw head and the outer surface of its associated channel section. The washers are of such thickness as to retain the points 44 of the screws entirely within the channels, so that they cannot engage and damage the mirror even when the screws are fully tightened. This usage requires that the mirror, if its is to be tightly clamped in position, must be clamped against the standard channels themselves, which in turn requires that the hook openings correspond more closely to the mirror thickness, although some variation of mirror thickness can be accommodated by resilience of the hooks. Actually, the thickness of both the plate glass used in mirrors, and the material used for frame back plates 8, is so generally standardized that very little difficulty has been experienced in this connection. When the mirror is unframed, the forward legs 38 of the hooks are of course exposed to view, as indicated in FIG. 5, and they can be made decorative in form or finish if desired.

Sometimes, as when quick and easy detachability is desired, the above described clamping type of mounting may be considered objectionable. it may be preferred, on the contrary, that the mirror be suspended by eyes or the like from upwardly opening hooks, in the manner of hanging a picture on the wall. Most mirrors, as a matter of fact, are commonly furnished to the purchasers with suspending means of one type or another already attached to the rearward faces thereof, whether the mirror is framed or unframed. The present bracket may be easily adapted for this type of usage simply by reversing top hook 30 to open upwardly as shown in FIG. 7. This may be done after first removing screw 40 of that hook. The mirror shown in FIG. 7 has one or more eyes 48 (one shown) pivoted to the back plate 8 thereof by bracket 50. Said eye is simply engaged downwardly over hook leg 38, and supported by hook connecting portion 36. With this type of suspension, lower hook 32 may be used or not, as desired. When used, it provides more secure positioning of the mirror, and may also carry at least a portion of its weight. When the lower hook is not used, the mirror simply hangs from upper hooks 30, being retained in a substantially vertical position by the standard. When the lower hook is used, it may also be set a little higher on the standard than would be required for vertical positioning of the mirror. In that case, the lower hook would support the mirror weight, and the top edge of the mirror would tilt forwardly as far as permitted by suspension eye 48. This is the condition illustrated in FIG. 7. This tilting is sometimes desired, for example by ladies wishing to check their hemlines. Any desired degree of tilt could be obtained by using eyes 48 of different lengths.

While I have shown and described a specific embodiment of my invention, it will be readily apparent that many minor changes of structure and operation could be made without departing from the spirit of the invention.

What I claim as new and desire to protect by Letters Patent is:

1. A mirror supporting bracket comprising:
   a. a standard adapted to be affixed at its lower end to a furniture piece, and to extend thereabove,
   b. an upper hook and a lower hook, and
   c. means affixing said hooks to said standard, with said upper hook opening downwardly and said lower hook opening upwardly, both forwardly of said standard, whereby to engage therein the upper and lower edges of a mirror,
   said means affixing said upper hook to said standard being operable to permit selective reversal of said upper hook to open either downwardly or upwardly, whereby in its upwardly opening position to serve as a suspension means over which suspension eyes of a mirror may be downwardly engaged to support said mirror.

2. A bracket as recited in claim 1 wherein said standard comprises a forwardly opening channel member, and wherein each of said hooks is of substantially U-form, having a pair of generally parallel legs parallel to said channel and disposed respectively adjacent the inner surface of the channel base and in forwardly spaced relation from the open front of said channel, and wherein said means affixing each of said hooks to said standard comprises a headed screw extending forwardly and rotatably through the base of the channel and threaded in the rearward leg of said hooks whereby as said screw is tightened, said hook is drawn rearwardly to clamp said mirror between the forward leg of said hook and the front of said channel.

3. A bracket as recited in claim 2, for use in connection with a framed mirror, the frame having a back plate of tough material which is engaged by said hooks, wherein said screw is of such length that, when fully tightened, its forward end can be moved closer to the front hook leg than the thickness of said back plate, and forwardly of the open front of said channel, whereby said back plate is clamped between said forward hook leg and the forward end of said screw.

4. A bracket as recited in claim 3 wherein said back plate is formed of indentable material and the forward end of said screw is sharply pointed, whereby as said screw is tightened it indents said back plate, and whereby on further tightening of said screw, said back plate is clamped against the front of said channel by said front hook leg.

5. A bracket as recited in claim 3 wherein said limiting means comprises a washer applicable to said screw intermediate its head and the back of said channel.

6. A bracket as recited in claim 3 with the addition of adaptor means whereby said bracket is adapted for use with unframed mirrors having no back plates and which engage the front of the channel directly, said adaptor means consisting of means operable to limit the forward insertion of said screw, whereby the forward end of the screw cannot advance forwardly of the front of the channel, and hence cannot engage the mirror plate.

* * * * *